United States Patent [19]
Folsom

[11] Patent Number: 5,896,745
[45] Date of Patent: Apr. 27, 1999

[54] SWASHPLATE ASSEMBLIES FOR INFINITELY VARIABLE HYDROSTATIC TRANSMISSIONS

[75] Inventor: Lawrence R. Folsom, Pittsfield, Mass.

[73] Assignee: General Dynamics Defense Systems, Inc., Falls Church, Va.

[21] Appl. No.: 08/848,619

[22] Filed: Apr. 29, 1997

[51] Int. Cl.⁶ .............................. F16D 31/02; F16H 61/00
[52] U.S. Cl. .............................................................. 60/490
[58] Field of Search .............................. 60/490, 491, 492

[56] References Cited

U.S. PATENT DOCUMENTS

| | | | |
|---|---|---|---|
| 5,423,183 | 6/1995 | Folsom | 60/491 |
| 5,486,142 | 1/1996 | Folsom | 60/492 |
| 5,493,862 | 2/1996 | Folsom | 60/492 |
| 5,642,617 | 7/1997 | Larkin et al. | 60/492 |
| 5,678,405 | 10/1997 | Folsom | 60/492 |

FOREIGN PATENT DOCUMENTS

| | | |
|---|---|---|
| 1069978 | 11/1959 | Germany . |
| 1030987 | 5/1966 | United Kingdom . |
| 1263081 | 2/1972 | United Kingdom . |

*Primary Examiner*—Sheldon J. Richter
*Attorney, Agent, or Firm*—Finnegan, Henderson, Farabow, Garrett & Dunner

[57] ABSTRACT

An infinitely variable hydrostatic transmission includes an input shaft connected to drive a hydraulic pump unit, a grounded hydraulic motor unit, and an output shaft. A swashplate assembly is connected to impart output torque to the output shaft resulting from the pumped exchanges of pressured hydraulic fluid between the hydraulic pump and motor units. A ratio controller is linked to independently, variably position input and output members of the swashplate assembly and thus vary nutating magnitudes of cylinder blocks of the hydraulic pump and motor units, pursuant to adjustably setting ratio conditions of the transmission.

13 Claims, 3 Drawing Sheets

SWASHPLATE ASSEMBLIES FOR INFINITELY VARIABLE HYDROSTATIC TRANSMISSIONS

REFERENCE TO RELATED PATENTS AND APPLICATIONS

The invention disclosed in this application has particular, but not necessary limited, application to continuously variable hydrostatic transmission of the type disclosed in applicant's U.S. Pat. Nos. 5,423,183; 5,493,862; and 5,486,142; and application Ser. No. 08/418,692, filed Apr. 7, 1995 now U.S. Pat. No. 5,642,617. The disclosures of these patents and application are incorporated herein by reference.

FIELD OF THE INVENTION

The present invention relates to continuously variable hydrostatic transmissions and particularly to such transmissions utilizing swashplates for coupling torque onto the transmission output shaft.

BACKGROUND OF THE INVENTION

The continuously variable hydrostatic transmissions disclosed in the above-cited documents include a hydraulic pump unit and a hydraulic motor unit positioned in opposed, axially aligned relation with an intermediate, wedge-shaped swashplate. The pump unit is connected to an input shaft driven by a prime mover, while the motor unit is grounded to the stationary machine housing. An output shaft, coaxial with the input shaft and drivingly coupled to a load, is pivotally connected to the swashplate in torque-coupled relation. When the pump unit is driven by the prime mover, hydraulic fluid is pumped back and forth between the pump and motor units through ports in the swashplate. As a result, three torque components, all acting in the same direction, are exerted on the swashplate to produce output torque on the output shaft for driving the load. Two of these torque components are a mechanical component exerted on the swashplate by the rotating pump unit and a hydromechanical component exerted on the swashplate by the motor unit. The third component is a pure hydrostatic component resulting from the differential forces created by the fluid pressures acting on circumferentially opposed end surfaces of the swashplate ports, which are of different surface areas due to the wedge shape of the swashplate.

To change transmission ratio, the angular orientation of the swashplate relative to the axis of the output shaft is varied by a ratio controller. Since the transmission ratio, i.e., ratio of input shaft speed to output shaft speed, is continuously variable between 1:0 and 1:1, the prime mover can run at a constant speed set essentially at its most efficient operating point. The availability of a 1:0 (neutral) transmission ratio setting may eliminate the need for a clutch. As is indicated in cited U.S. Pat. No. 5,486,142, the swashplate can be positioned to angular orientations beyond the 1:0 ratio setting to provide limited infinitely variable speed drive in a reverse direction, as well as to angular orientations beyond the 1:1 setting to provide a limited, infinitely variable, overdrive speed range. Significantly, reverse drive is available without need for a reversing gear mechanism.

Unlike conventional, continuously variable hydrostatic transmissions, wherein hydraulic fluid flow rate increases proportionately with increasing transmission ratio such that maximum flow rate occurs at the highest transmission ratio setting, the flow rate in the transmissions disclosed in the cited applications reaches a maximum at a midpoint in the ratio range and then progressively decreases to essentially zero at the 1:1 transmission ratio setting. Thus, losses due to hydraulic fluid flow are reduced, and the annoying whine of conventional hydrostatic transmissions at high ratios is avoided. By virtue of the multiple torque components exerted on the swashplate, the decreasing hydraulic fluid flow in the upper half of the output speed range, and the capability of accommodating a prime mover input operating at or near its optimum performance point, the hydraulic machines of the cited U.S. patents and application have a particularly advantageous application as highly efficient, quiet, continuously variable hydrostatic transmissions in vehicular drive trains.

To accommodate operation at the infinitely variable transmission ratios set by the angular orientations of the swashplate, cylinder blocks of the hydraulic pump and motor units, pressed in sliding, interfacial engagement with opposed faces of the swashplate, are mounted by large spherical bearings concentric with the output shaft axis. These spherical bearings permit independent nutating motions of the pump and motor cylinder blocks during transmission operation; the amplitudes of these nutating motions are determined by the inclination angles of the engaging swashplate faces, which, in turn, are determined by the transmission ratio-setting angular orientation of the swashplate. It is the nutating motions of the pump and motor cylinder blocks that produce the hydraulic fluid pumping action of axially fixed pistons received in cylinders of the cylinder blocks. The swashplates disclosed in the cited patent documents consist of a unitary annular member having opposed faces, i.e., an input face in sliding contact with the pump cylinder block face and on output face in sliding contact with the motor cylinder block face. The input and output faces are formed to define an acute included angle of, for example, 12°, hence the wedge shape of the swashplate. This included angle is, however, fixed. Thus, transmission ratio is varied by changing the angular orientation of the swashplate, more particularly the angular orientations of the input and output faces of the swashplate. As disclosed in the cited documents, when the input face is oriented normal to the output shaft axis, the nutating magnitude of the pump cylinder block is zero. The nutating magnitude of the motor cylinder block is then necessarily high, essentially a maximum, neglecting the narrow reverse range. As a result, the transmission is set to a 1:0 ratio (neutral). Conversely, when the output face is normal to the output shaft axis, the nutating magnitude of the motor cylinder block goes to zero, and the nutating magnitude of the pump cylinder block is a maximum, neglecting the narrow overdrive range.

The fixed included angle between the swashplate input and output faces, however, imposes several limitations on the transmission. For example, when the wedge-shaped swashplate is oriented to a neutral setting, i.e., input face normal to output shaft axis, it is not a "true" neutral in the automotive sense. Because the motor cylinder block is nutating, the transmission output shaft is not free to turn, i.e., coast. Thus, in automotive applications, to achieve a "true" neutral at a swashplate neutral setting, a clutch must be included to decouple the transmission output shaft from the vehicle driving wheel(s) or to decouple the vehicle engine from the transmission input shaft. Alternatively, a "true" neutral may be achieved by depressurizing the hydraulic pump and motor units, as disclosed in Larkin U.S. patent application Ser. No. 08/543,545, filed Oct. 16, 1995.

Another limitation imposed by the fixed swashplate included angle is low end torque. It would be advantageous to elevate the motor cylinder block nutation beyond the maximum magnitude imposed by a fixed included angle as the swashplate is pivoted into the forward range from neutral and thereby increase output torque when it is most needed to accelerate a vehicle from a standing start. The fixed included angle also reduces the available ratio range in both overdrive and reverse.

SUMMARY OF THE INVENTION

It is accordingly a basic objective of the present invention to overcome the above-noted limitations indigenous to infinitely variable hydrostatic transmission employing a wedge-shaped swashplate having a fixed included angle between its input and output faces.

To achieve this and other objectives, an infinitely variable hydrostatic transmission in accordance with the present invention, as embodied and broadly described, includes an input shaft for driven connection to a prime mover, an output shaft for driving connection to a load and having an axis, a hydraulic pump unit driven by the input shaft and including a pump cylinder block mounted for nutating motion and having a face, and a non-rotating hydraulic motor unit including a motor cylinder block mounted for nutating motion and having a face. The transmissions further includes a swashplate assembly, mounted in torque-coupled relation with the output shaft, and including a first member having an input face in sliding contact with the pump cylinder block face and mounted for movement to vary a magnitude of the pump cylinder block nutating motion, and a second member having an output face in sliding contact with the motor cylinder block face and mounted for movement to vary a magnitude of the motor cylinder block nutating motion, and flow paths through the first and second members accommodating pumped exchanges of hydraulic fluid between the hydraulic pump and motor units to produce torque on the output shaft. The transmission also includes a controller connected to move the first and second members to adjustably set the magnitudes of the pump and motor cylinder such that cylinder block nutating motions may be independently controlled, thereby establishing a desired transmission ratio of input shaft speed to output shaft speed.

Additional features, advantages, and objectives of the invention will be set forth in the description which follows and in part will be apparent from the description, or may be learned by practice of the invention. The objectives and advantages of the present invention will be realized and attained by the apparatus and method particularly pointed out in the following written description and the appended claims, as well as in the accompanying drawing.

It will be understood that both the foregoing general description and the following detailed description are exemplary and explanatory and are intended to provide further explanation of the invention as claimed.

The accompanying drawing is intended to provide a further understanding of the invention and is incorporated in and constitutes a part of the specification, illustrates a preferred embodiment of the invention and, together with the description, serves to explain the principles of the invention.

BRIEF DESCRIPTION OF THE DRAWINGS

Like reference numerals refer to corresponding parts throughout the several views of the drawings.

DETAILED DESCRIPTION OF THE PREFERRED EMBODIMENTS OF THE PRESENT INVENTION

The infinitely (continuously) variable hydrostatic transmission in accordance with the various embodiments of the present invention comprises, in its generic aspects, an input shaft for receiving input torque and an output shaft for imparting output torque to a load. The input shaft, in turn, drives a hydraulic pump unit, while a hydraulic motor unit is grounded against rotation, e.g., bolted to the transmission housing. The hydraulic pump unit includes a pump cylinder block that is swivel-mounted such that it may undergo nutating motion. Similarly, the hydraulic motor unit includes a motor cylinder block also swivel-mounted for nutating motion.

Further in accordance with the present invention, as embodied and generically described herein, a swashplate assembly is torque-coupled to the output shaft in an operative position between the hydraulic pump and motor units. More particularly, the swashplate assembly includes a first or input member having an input face in sliding contact with a face of the pump cylinder block and a second or output member having an output face in sliding contact with a face of the motor cylinder. The input and output swashplate members are mounted for independent movements to respectively vary the magnitudes of the nutating motions of the pump and motor cylinders blocks. Further in accordance with the present invention as embodied and generically described herein, the input and output swashplate members are provided with flow paths to accommodate pumped exchanges of hydraulic fluid between the hydraulic pump and motor units, such as to produce torque on the output shaft.

Finally, in accordance with the present invention as embodied and generally described herein, a controller is connected to separately move the input and output swashplate members and thereby adjustably set the nutating magnitudes of the pump and motor cylinder blocks, such that a desired transmission ratio of input shaft speed/torque to output shaft speed/torque may be established.

Figure 1A:
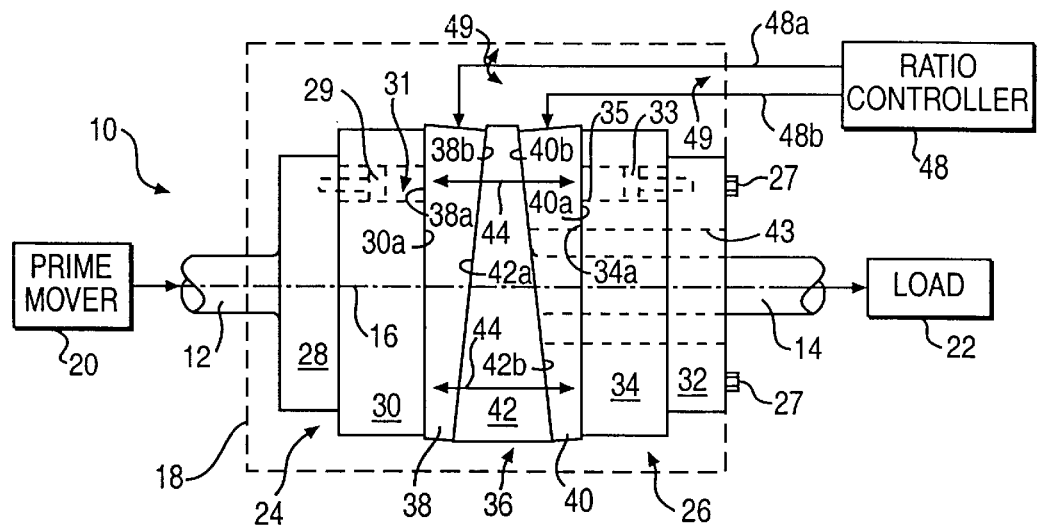
FIGS. 1a–1c illustrate in partial schematic form an infinitely variable hydrostatic transmission according to one embodiment of the present invention in representative three different settings.
Figure 1B:
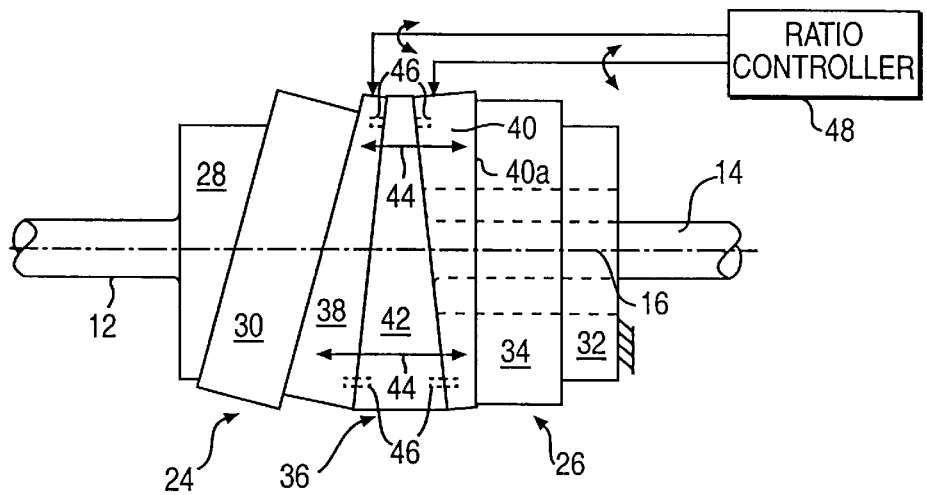
Figure 1C:
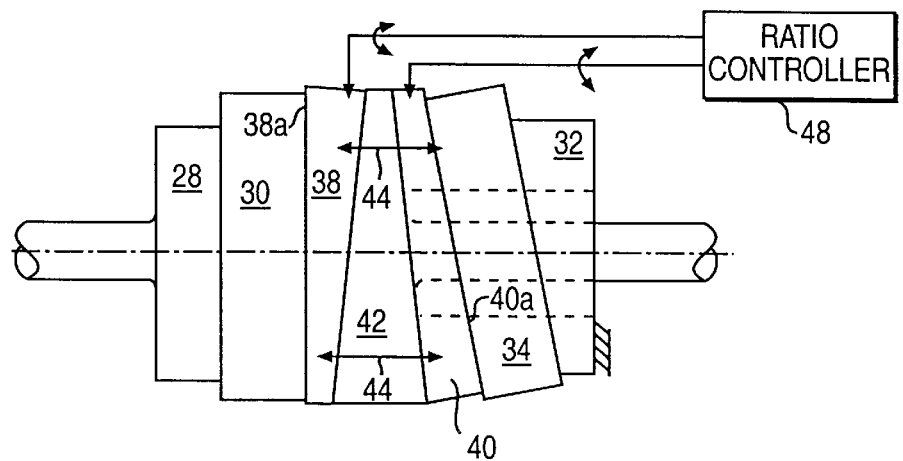

Now considering the embodiments of the present invention in greater detail, FIGS. 1a–1c illustrate a first embodiment of an infinitely variable hydrostatic transmission generally indicated 10. This transmission comprises an input shaft 12 and an output shaft 14, both journaled for rotation about a common axis 16 by a housing, illustrated in phantom line at 18. The input shaft is driven by a prime mover 20, such as a vehicle engine, while the output shaft drives a load 22, such as a drive wheel(s) of a vehicle.

Enclosed within housing 18 are a hydraulic pump unit, generally indicated at 24 and driven by input shaft 12, and a hydraulic motor unit, generally indicated at 26 and grounded to the housing by bolts 27. Hydraulic pump unit 24 includes a piston carrier 28 fixed to the input shaft and a pump cylinder block 30 providing an annular array of pump cylinders, one indicated in phantom at 31, for respectively receiving a corresponding annular array of pump pistons, one indicated in phantom at 29 and mounted by carrier 28.

Hydraulic motor unit 26 includes a piston carrier 32 fixed to the housing by bolts 27 and a motor cylinder block 34 providing an annular array of motor cylinders, one illustrated in phantom at 35, for respectively receiving a corresponding annular array of motor pistons, one illustrated in phantom at 33 and mounted by carrier 32. The pump and motor cylinder blocks are separately swivel-mounted for independent nutating motions, such as by spherical bearings (not shown). Reference may be had to the cited documents for hydraulic pump and motor unit details, including the swivel mountings of the pump and motor cylinder blocks.

In accordance with a generic feature of the present invention, operatively positioned between hydraulic pump unit 24 and hydraulic motor unit 26 is a swashplate assembly, generally indicated at 36. Unlike the single, wedge-shaped swashplate of the cited patent documents, the swashplate of the present invention comprises an assembly of swashplate members including an input member 38, an output member 40, and, in the embodiment of FIGS. 1a–1c, an intermediate member 42 that is fixed in torque-coupled relation to the inner end of output shaft 14 extending through a central opening, commonly indicated at 43, in the hydraulic motor unit components and output swashplate member 40.

In the embodiment of the invention illustrated in FIGS. 1a–1c, each of the three swashplate members is in the form of a disk having a wedge-shaped cross section. Input swashplate member 38 has an input face 38a in sliding facial contact with face 30a of pump cylinder block 30, while output swashplate member 40 has an output face 40a in sliding facial contact with face 34a of motor cylinder block 34. The input swashplate member is supported by intermediate swashplate member 42, such that face 38b of the input swashplate member, opposite input face 38a, is in sliding contact with face 42a of the intermediate swashplate member. Similarly, the output swashplate member 40 is separately mounted by the intermediate swashplate member 42 with its face 40b, opposite its output face 40a, in sliding contact with face 42b of the intermediate swashplate member. Such mountings may be effected, as phantomly indicated at 46 in FIG. 1b, by the provision of tongues running in arcuate grooves at the respective interfaces of the input and output swashplate members with the intermediate swashplate member, which mountings permit ratio-changing rotations of the input and output swashplate members relative to the intermediate swashplate member.

Double-headed arrows 44 schematically represent flow paths through the three swashplate members that accommodate pumped exchanges of high and low pressure hydraulic fluid between the hydraulic pump 24 and motor 26 units. Formed in the surfaces 42a, 42b of intermediate swashplate member 42 and included in these flow paths 44 are kidney-shaped slots (not shown) having circumferentially opposed endwalls of differential surface area requisite to generating hydrostatic torque components, as described in the cited patent documents.

Finally, a ratio controller 48 is operatively connected, as indicated at 48a and 48b, to independently rotate, as indicated by double-headed arrows 49, input 38 and output 40 swashplate members about shaft axis 16, such as to vary the angles of input face 38a and output face 40a relative to the shaft axis. As noted above, the input and output face angles determine the nutating magnitudes of the pump 30 and motor 34 cylinder blocks, respectively, which, in turn, determine transmission ratio.

FIG. 1a illustrates a setting for transmission 10, specifically a "true" neutral setting (1:0), that cannot be achieved for the transmissions of the cited patent documents, which employ a single wedge-shaped swashplate. As seen, the input and output swashplate members have been angularly oriented by ratio controller 48, such that both input face 38a and output face 40a are normal to shaft axis 16. Consequently, neither pump cylinder block 30 nor motor cylinder block 34 undergo nutating motion, and thus output shaft 14 is free to rotate (coast).

Transmission 10 is therefore in a "true" neutral setting.

FIG. 1b illustrates transmission 10 set to a 1:1 ratio, since ratio controller 48 has angularly oriented output swashplate member 40 to position its output face 40a normal to shaft axis 16.

In FIG. 1c, ratio controller 48 has rotated input swashplate member 38 to orient its input face 38a normal to shaft axis 16, as in FIG. 1a, to set transmission 10 to neutral (1:0 ratio). However, output swashplate member 40 is oriented with its output face 40a inclined rather than normal to shaft axis 16, and this motor cylinder block 34 undergoes nutating motion. Thus, unlike FIG. 1a, transmission 10 is not set to "true" neutral. Unlike the single wedge-shaped swashplate of the cited documents, output swashplate member 40 can be oriented to position its output facts 40a at an increased inclination angle to normal and thus achieved an increased magnitude of motor cylinder block nutating motion. Consequently, increased torque is available as input swashplate member 38 is rotated by ratio controller 48 to angle input face 38a away from its neutral position normal to shaft axis 16. Thus, increased low speed range torque is available when it is most needed to accelerate a vehicle from rest.

Figure 2A:
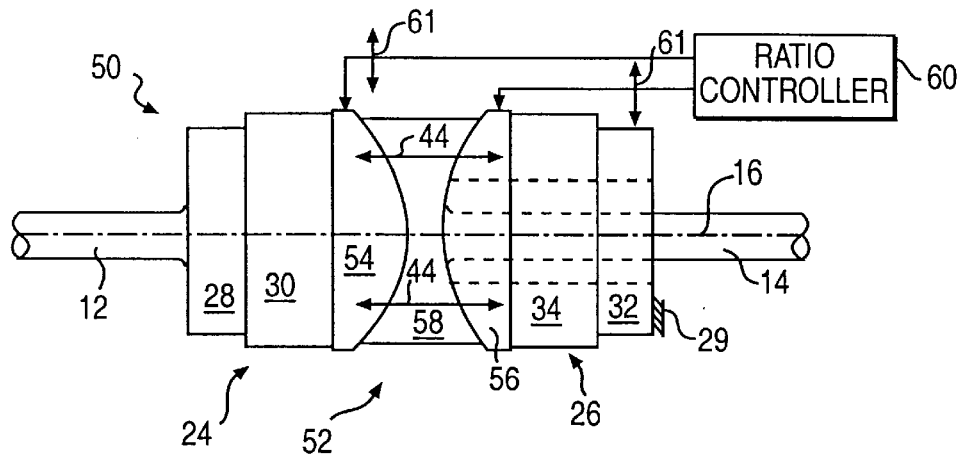
FIGS. 2a–2c illustrate in partial schematic form an infinitely variable hydrostatic transmission according to a second embodiment of the present invention in representative three different settings.
Figure 2B:
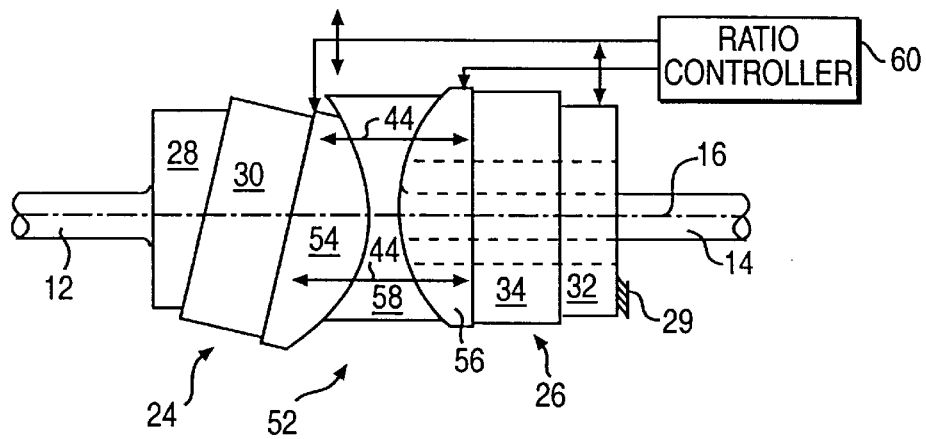
Figure 2C:
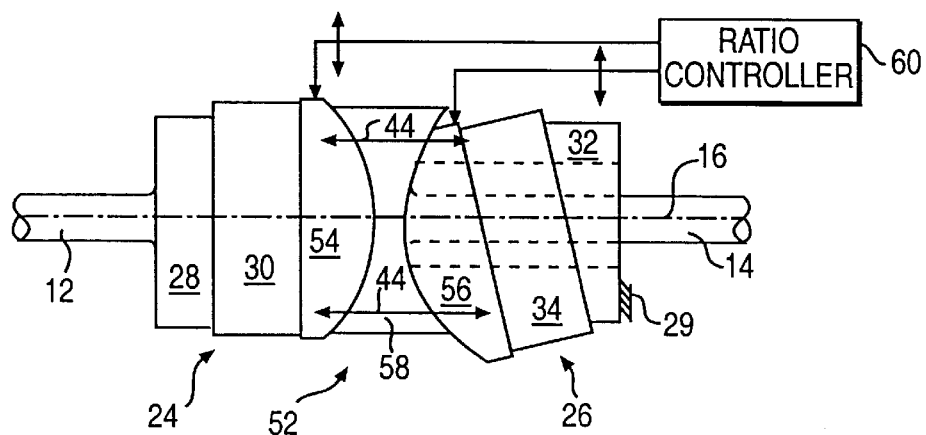

In the embodiment of the invention illustrated in FIGS. 2a–2c, an infinitely variable hydrostatic transmission, generally indicated at 50, comprises an input shaft 12 connected to drive a hydraulic pump unit 24 including a piston carrier 28 and a swivel-mounted pump cylinder block 30. A hydraulic motor unit 26, including a piston carrier 32 and a swivel-mounted motor cylinder block 34, is grounded to the transmission housing (not shown), as indicated at 29. Operatively positioned between the hydraulic pump and motor units is a swashplate assembly, generally indicated at 52, including an input swashplate member 54, an output swashplate member 56, and an intermediate swashplate member 58 drivingly connected to the inner end of output shaft 14. Rather than interengaging planar faces, as in the case of the wedge-shaped swashplate members of swashplate assembly 36 in the transmission embodiment 10 of FIGS. 1a–1c, the swashplate members of the transmission 50 have interengaging semicylindrical-shaped faces.

Thus, as seen in FIGS. 2a–2c, intermediate swashplate member 58 is of an "hourglass" shape having opposed concave semicylindrical faces 58a and 58b. Face 58a is in interfacial contact with a convex semicylindrical face 54b of input swashplate member 54, while face 58b is in interfacial contact with a convex semicylindrical face 56b of output swashplate member 56. Planar input face 54a of input swashplate member 54 slidingly engages face 30a of pump cylinder block 30, and planar output face 56a slidingly engages face 34a of motor cylinder block 34. A ratio controller 60 is mechanically linked, as schematically indicated at 60a, to exert a vertical force, indicated by double-tipped arrow 61, on input swashplate member 54, thereby varying the angular orientation of input face 54a and thus the nutating magnitude of pump cylinder block 30. Ratio controller 60 is also separately mechanically linked, as indicated schematically at 60b, to exert a vertical force, indicated by double-tipped arrow 61, on output swashplate member 56, thereby varying the angular orientation of output face 56a and thus the nutating magnitude of motor cylinder block 34.

In correspondence to FIGS. 1a–1c, FIGS. 2a–2c respectively illustrate input 54 and output 56 swashplate members being oriented by ratio controller 60 to set transmission 50, respectively, to a "true" neutral setting, a 1:1 ratio setting, and a "neutral"-increased torque ratio setting. Arrows 44 schematically represent pumped exchanges of high and low pressure hydraulic fluid through swashplate assembly 22 between hydraulic pump 24 and motor 26 units. Since the input 54 and output 56 swashplate members cannot rotate relative to intermediate swashplate member 58 by virtue of their semicylindrical interfacial contact, the hydrostatic torque-producing, kidney-shaped slots (not shown herein), disclosed in the cited patent documents, may be formed in the input 54a and output 56a faces of the input and output swashplate members.

Figure 3:
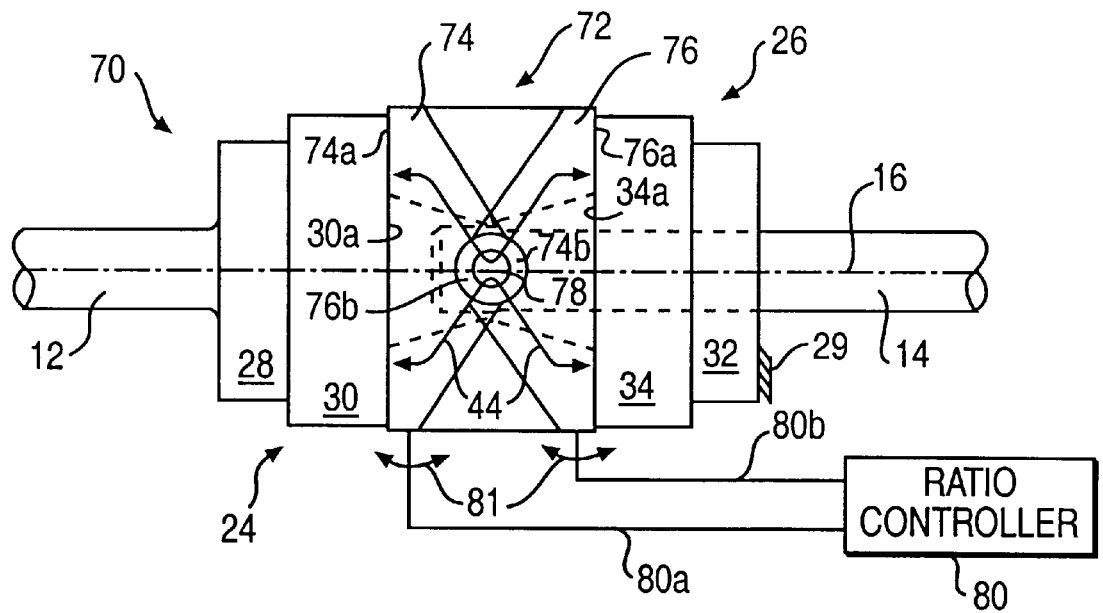
FIGS. 3 and 4 illustrate in partial schematic form infinitely variable hydrostatic transmissions in accordance with further embodiments of the present invention.

In the embodiment of the invention seen in FIG. 3, an infinitely variable hydrostatic transmission, generally indicated at 70, comprises, is in the above-described embodiments, an input shaft 12 driving a hydraulic pump unit 24 including a piston carrier 28 and a swivel-mounted pump cylinder block 30. A hydraulic motor unit 26, grounded to the housing as indicated at 29, includes a piston carrier 32 and a swivel-mounted motor cylinder block 34.

Operatively positioned between the hydraulic pump and motor units is a swashplate assembly 72 including only two members, an input swashplate member 74 and an output swashplate member 76. Input swashplate member 74 is provided with a diametrically opposed, apertured ears (one seen at 74b), which lap with corresponding diametrically opposed, apertured ears (one seen at 76b) of output swashplate member 76, such that the two swashplate members may be pivotally mounted on a transverse stub shaft 78 carried at the inner end of output shaft 14.

A ratio controller 80 is mechanically linked, as indicated at 80a, to pivot input swashplate member 74 about stub shaft 78 (as indicated by double-tipped arrow 81) and thus vary the angular orientation of input face 74a relative to shaft axis 16, as well as the nutating magnitude of pump cylinder block 30. Ratio controller 80 is mechanically linked, as indicated schematically at 80b, to independently pivot output swashplate member 76 about stub shaft 78, as indicated by double-tipped arrow 81, and thus vary the angular orientation of output face 76a relative to shaft axis 16 and correspondingly vary the nutating magnitude of motor cylinder block 34. While FIG. 3 illustrates a "true" neutral transmission setting (both input 74a and output 76a faces normal to shaft axis 16), it will be appreciated that ratio controller 80 can readily orient the input 74 and output 76 swashplate members to achieve the transmission ratio settings illustrated in FIGS. 1b, 1c, 2b, and 2c, infinitely variable ratio settings therebetween, and narrow reverse and overdrive operating ranges.

Arrows 44 in FIG. 3 schematically represent flow paths accommodating pumped exchanges of high and low pressure hydraulic fluid between the hydraulic pump and motor units. However, since the swashplate assembly 72 does not include an intermediate swashplate member in interfacial contact with the input and output swashplate members, the flow paths 44 are routed through stub shaft 78 in the manner taught in the cited U.S. Pat. No. 5,493,862. The requisite hydrostatic torque-producing, kidney-shaped slots (not shown) are formed in input face 74a of input swashplate member 74 and in output face 76a of output swashplate member 76.

Figure 4:
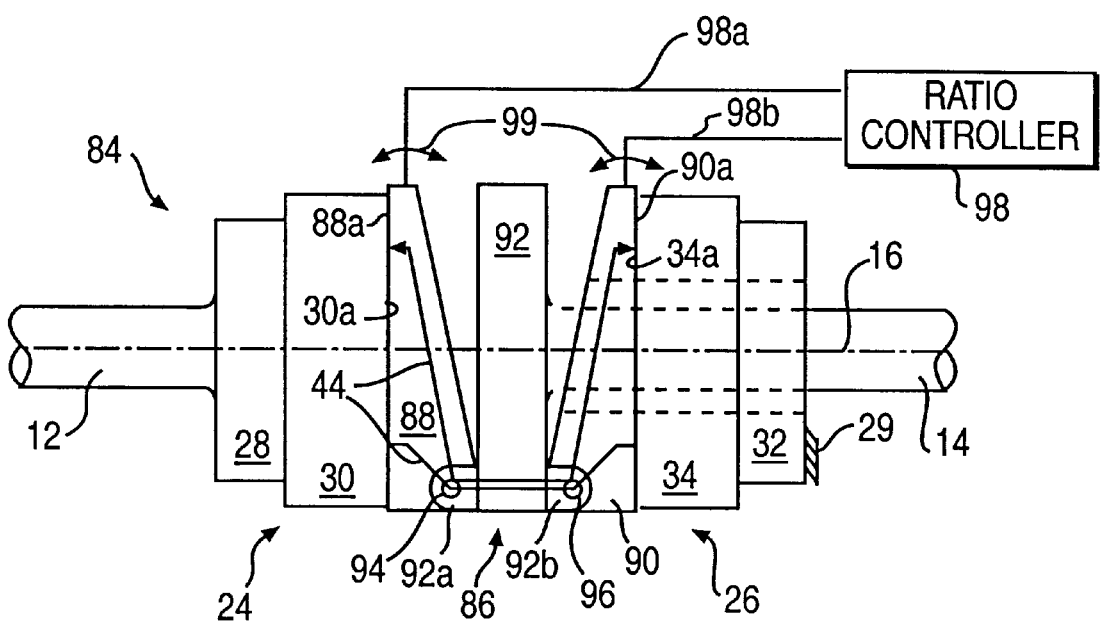

The last illustrated embodiment of the invention, as seen in FIG. 4, is in the form of an infinitely variable hydrostatic transmission, generally at 84, comprising a hydraulic pump unit, 24 driven by input shaft 12 and including a piston carrier 28 and a swivel-mounted pump cylinder block 30. A hydraulic motor unit, 26, grounded to the transmission housing as indicated at 29, includes a piston carrier 32 and a swivel-mounted motor cylinder block 34. Operatively positioned between the hydraulic pump and motor units is a swashplate assembly, generally indicated at 86. The swashplate assembly includes a wedge-shaped input swashplates member 88, a wedge-shaped output swashplate member 90, and a truncated cylinder-shaped intermediate member 92 fixed to the inner end of output shaft 14. Input swashplate member 88 is pivotally mounted on a transverse shaft 94 in radially offset relation to output shaft axis 16, which, in turn, is mounted at its ends by a pair of transversely spaced, apertured ears, one seen at 92a, extending longitudinally toward the transmission input end from intermediate swashplate 92. Similarly, output swashplate member 90 is pivotally mounted by a transverse shaft 96 in corresponding radially offset relation to output shaft axis 16, which, in turn, is mounted at its ends by a pair of transversely spaced apertured ears, one seen at 92b, extending longitudinally toward the transmission output end from intermediate swashplate member 92.

A ratio controller 98 is linked, as schematically indicted at 98a, to pivot input swashplate member 88 about shaft 94, as indicated by double-tipped arrow 99, and thus vary the angular orientation of its input face 88a relative to shaft axis 16. Ratio controller 98 is also separately linked, as indicated schematically at 98b, to pivot output swashplate member 90 about shaft 96, as indicated by double-tipped arrow 99, and thus vary the inclination of output face 90a relative to shaft axis 16. It is thus seen that ratio controller 98 is capable of varying the nutating magnitudes of the pump 30 and motor 34 cylinder blocks, pursuant to establishing the particular transmission settings illustrated in FIGS. 1a–1c and 2a–2c (a "true" neutral setting being illustrated in FIG. 4), as well as infinitely variable intermediate ratio settings and narrow reverse and overdrive speed range transmission operations.

The hydrostatic torque producing, kidney-shaped slots (not shown) are formed in input face 88a, slidingly engaging pump cylinder block face 30a, and output face 90a, slidingly engaging motor cylinder block face 34a. Since the input and output swashplate members are not in interfacial contact with intermediate swashplate member 92, the flow paths 44 accommodating the pumped exchanges of high and low pressure hydraulic fluid between the hydraulic pump and motor units are routed through shafts 94 and 96.

From the foregoing description, it is seen that, by providing a swashplate assembly including at least separate input and output swashplate members that can be oriented to independently control nutating magnitudes of the pump and motor cylinder blocks, operating versatility of a hydrostatic transmission is dramatically increased, such that varying load conditions may be more precisely matched. Transmission performance and efficiency can thus be substantially optimized.

The invention will be further clarified by the following examples, which are intended to be purely exemplary of the invention.

It will be apparent to those skilled in the art that various modifications and variations can be made in the disclosed embodiments of the infinitely variable hydrostatic transmission of the present invention and in constructions thereof without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An infinitely variable hydrostatic transmission comprising:

an input shaft for driven connection to a prime mover;

an output shaft for driving connection to a load and having an axis:

a hydraulic pump unit driven by the input shaft and including a pump cylinder block-mounted for nutating motion and having a face;

a non-rotating hydraulic motor unit including a motor cylinder block mounted for nutating motion and having a face;

a swashplate assembly mounted in torque-coupled relation with the output shaft, the swashplate assembly including;

a first member having an input face in sliding contact with the pump cylinder block face and mounted for movement to vary a magnitude of the pump cylinder block nutating motion, and a second member having an output face in sliding contact with the motor cylinder block face and mounted for movement to vary a magnitude of the motor cylinder block nutating motion; and flow paths through the first and second members accommodating pumped exchanges of hydraulic fluid between the hydraulic pump and motor units to produce torque on the output shaft; and a controller connected to separately move the first and second members and thereby to adjustably set the magnitudes of the pump and motor cylinder block nutating motions, such that a desired transmission ratio of input shaft speed to output shaft speed may be established.

2. The infinitely variable hydrostatic transmission defined in claim 1, wherein the first and second members are mounted to the output shaft for independent pivotal movements by the controller to adjustably set angular orientations of the input and output faces.

3. The infinitely variable hydrostatic transmission defined in claim 2, wherein the first and second members are commonly mounted by a shaft member fixed to the output shaft, an axis of the shaft member intersecting the output shaft axis at a right angle.

4. The infinitely variable hydrostatic transmission defined in claim 3, wherein the flow paths are provided by channels through the first and second members and the shaft member.

5. The infinitely variable hydrostatic transmission defined in claim 2, wherein the first and second members are pivotally mounted by separated shaft members fixed to the output shaft, the separate shaft members having respective axes parallel to each other and normal to the output shaft axis.

6. The infinitely variable hydrostatic transmission defined in claim 1, wherein the swashplate assembly further includes a third member fixed to the output shaft at a position between the first and second members, the third member supporting the first and second members for independent movements by the ratio controller to adjustably set angular orientations of the input and output faces.

7. The infinitely variable hydrostatic transmission defined in claim 6, wherein the third member carries separate shaft members respectively pivotally mounting the first and second members, the separate shaft members having respective axes parallel to each other and normal to the output shaft axis.

8. The infinitely variable hydrostatic transmission defined in claim 6, wherein the flow paths are provided by channels through the first, second, and third members and the shaft members.

9. The infinitely variable hydrostatic transmission defined in claim 6, wherein the third member is in interfacial contact with the first and second members.

10. The infinitely variable hydrostatic transmission defined in claim 9, wherein the first and second members are supported by the third member for independent rotational motion relative to the third member by the controller.

11. The infinitely variable hydrostatic transmission defined in claim 10, wherein each of the first, second and third members are wedge-shaped.

12. The infinitely variable hydrostatic transmission defined in claim 11, wherein the flow paths are provided by channels through the first, second, and third members.

13. The infinitely variable hydrostatic transmission defined in claim 9, wherein interfacial contacts between the first member and the third members and between the second member and the third member are semicylindrical interfacial contacts.

* * * * *